US010550767B2

(12) United States Patent
Eleftheriou et al.

(10) Patent No.: US 10,550,767 B2
(45) Date of Patent: Feb. 4, 2020

(54) GAS TURBINE ENGINE RECUPERATOR WITH FLOATING CONNECTION

(71) Applicant: Pratt & Whitney Canada Corp., Longueuil (CA)

(72) Inventors: Andreas Eleftheriou, Woodbridge (CA); David Menheere, Norval (CA); Daniel Alecu, Brampton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 252 days.

(21) Appl. No.: 15/188,277

(22) Filed: Jun. 21, 2016

(65) Prior Publication Data

US 2016/0298541 A1  Oct. 13, 2016

Related U.S. Application Data

(62) Division of application No. 13/036,407, filed on Feb. 28, 2011, now Pat. No. 9,394,828.

(51) Int. Cl.
*F02C 7/08* (2006.01)
*F28F 9/02* (2006.01)
(Continued)

(52) U.S. Cl.
CPC .............. *F02C 7/08* (2013.01); *F28D 9/0018* (2013.01); *F28D 21/001* (2013.01);
(Continued)

(58) Field of Classification Search
CPC ........ F02C 7/08; F28D 9/0018; F28D 21/001; F28F 9/0236; F28F 9/26; F28F 2265/26;
(Continued)

(56) References Cited

U.S. PATENT DOCUMENTS 2,553,867 A   5/1951  Parducci
2,650,073 A   8/1953  Holm
(Continued)

FOREIGN PATENT DOCUMENTS

EP   1589204   10/2005
GB   659151    10/1951
(Continued)

OTHER PUBLICATIONS

"Intercooled Recuperated Aero Engine" S. Boggia, K. Rud; Advanced Project Design, MTU Aero Engines, Munchen, Germany.
(Continued)

*Primary Examiner* — Ted Kim
(74) *Attorney, Agent, or Firm* — Norton Rose Fulbright Canada L.L.P.

(57) ABSTRACT

A method of installing a segment of a recuperator within an exhaust duct of a gas turbine engine, including positioning the segment such that its exhaust inlet is in fluid flow communication with the turbine section and its exhaust outlet is adapted to deliver an exhaust flow to atmosphere, engaging its air inlet to a plenum in fluid flow communication with the compressor discharge, and engaging its air outlet to another plenum containing the combustor. One of engaging the air inlet and engaging the air outlet includes forming a rigid connection providing sealed fluid flow communication with the corresponding plenum, and the other of engaging the air inlet and engaging the air outlet includes forming a floating connection providing sealed fluid flow communication with the corresponding plenum. The floating connection allows relative movement of the segment within the exhaust duct.

11 Claims, 12 Drawing Sheets

(51) Int. Cl.
*F28F 9/26* (2006.01)
*F28D 9/00* (2006.01)
*F28D 21/00* (2006.01)
*F28F 21/08* (2006.01)

(52) U.S. Cl.
CPC .............. *F28F 9/0236* (2013.01); *F28F 9/26* (2013.01); *F05D 2220/323* (2013.01); *F05D 2230/60* (2013.01); *F05D 2230/642* (2013.01); *F28F 21/087* (2013.01); *F28F 2230/00* (2013.01); *F28F 2265/26* (2013.01); *Y10T 29/49716* (2015.01)

(58) Field of Classification Search
CPC ................ F28F 2230/00; F28F 21/087; F05D 2220/323; F05D 2230/60; F05D 2230/642; Y10T 29/49716
See application file for complete search history.

(56) References Cited

U.S. PATENT DOCUMENTS

| | | | |
|---|---|---|---|
| 2,704,439 A | 3/1955 | Cousins | |
| 2,821,067 A | 1/1958 | Hill | |
| 2,925,714 A | 2/1960 | Cook | |
| 2,938,336 A | 5/1960 | Peterson | |
| 3,116,604 A | 1/1964 | Hall | |
| 3,201,938 A | 8/1965 | Zirin | |
| 3,228,464 A | 1/1966 | Stein et al. | |
| 3,267,673 A | 8/1966 | Hemsworth et al. | |
| 3,285,326 A | 11/1966 | Wosika | |
| 3,320,749 A | 5/1967 | Castle et al. | |
| 3,735,588 A | 5/1973 | Moskowitz | |
| 3,741,293 A | 6/1973 | Haberski | |
| 3,818,984 A | 6/1974 | Nakamura et al. | |
| 3,831,674 A | 8/1974 | Stein | |
| 3,866,674 A | 2/1975 | Tramuta et al. | |
| 3,885,942 A | 5/1975 | Moore | |
| 4,005,573 A | 2/1977 | Smale | |
| 4,090,358 A | 5/1978 | Young | |
| 4,180,973 A | 1/1980 | Forster et al. | |
| 4,391,564 A | 7/1983 | Garkusha et al. | |
| 4,431,050 A | 2/1984 | Martin | |
| 4,438,809 A | 3/1984 | Papis | |
| 4,470,454 A | 9/1984 | Laughlin et al. | |
| 4,506,502 A | 3/1985 | Shapiro | |
| 4,917,181 A | 4/1990 | Kiernan, Jr. et al. | |
| 4,993,223 A | 2/1991 | Kertzinger | |
| 5,004,044 A | 4/1991 | Horgan et al. | |
| 5,050,668 A | 9/1991 | Peterson et al. | |
| 5,060,721 A | 10/1991 | Darragh | |
| 5,081,834 A | 1/1992 | Darragh | |
| 5,243,815 A * | 9/1993 | Maier | F02C 7/08 60/800 |
| 5,388,398 A | 2/1995 | Kadambi et al. | |
| 5,855,112 A * | 1/1999 | Bannai | F02C 7/08 60/39.511 |
| 6,092,361 A | 7/2000 | Romani | |
| 6,357,113 B1 | 3/2002 | Williams | |
| 6,951,110 B2 | 10/2005 | Kang | |
| 7,036,562 B2 | 5/2006 | Ayers et al. | |
| 2002/0035830 A1 | 3/2002 | Fleer | |
| 2002/0124569 A1 | 9/2002 | Treece et al. | |
| 2002/0174978 A1 | 11/2002 | Beddome et al. | |
| 2005/0087330 A1 | 4/2005 | Kang | |
| 2006/0275111 A1 | 12/2006 | Orlando et al. | |
| 2010/0146980 A1 | 6/2010 | Strom | |
| 2012/0198810 A1 | 8/2012 | Ansari et al. | |

FOREIGN PATENT DOCUMENTS

| | | |
|---|---|---|
| GB | 1084889 | 9/1967 |
| GB | 2044361 | 10/1980 |

OTHER PUBLICATIONS

European Search Report for application No. 12157309.1, dated Jun. 20, 2012.
European Search Report for application No. 12157317.4, dated Jun. 26, 2012.

* cited by examiner

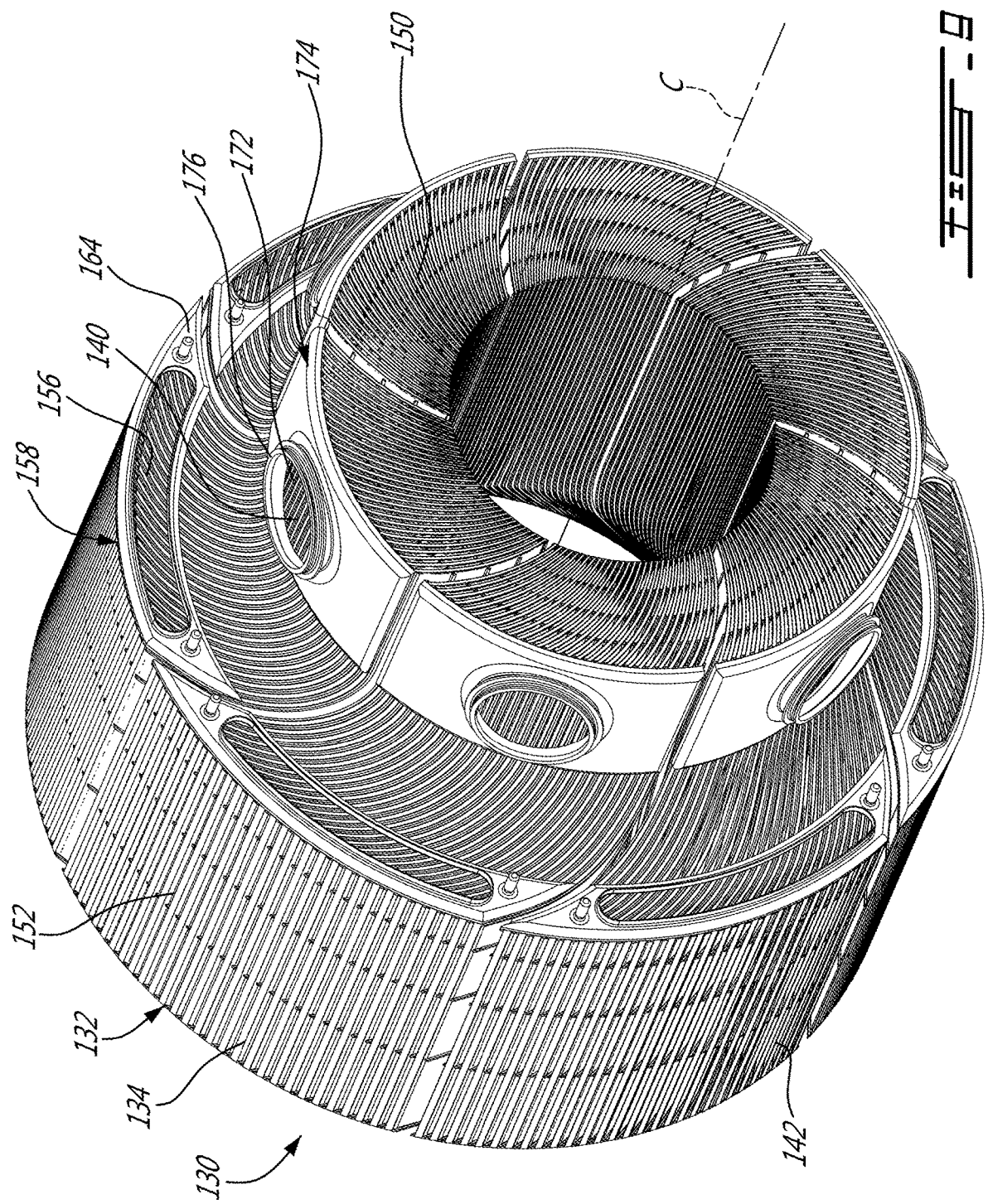

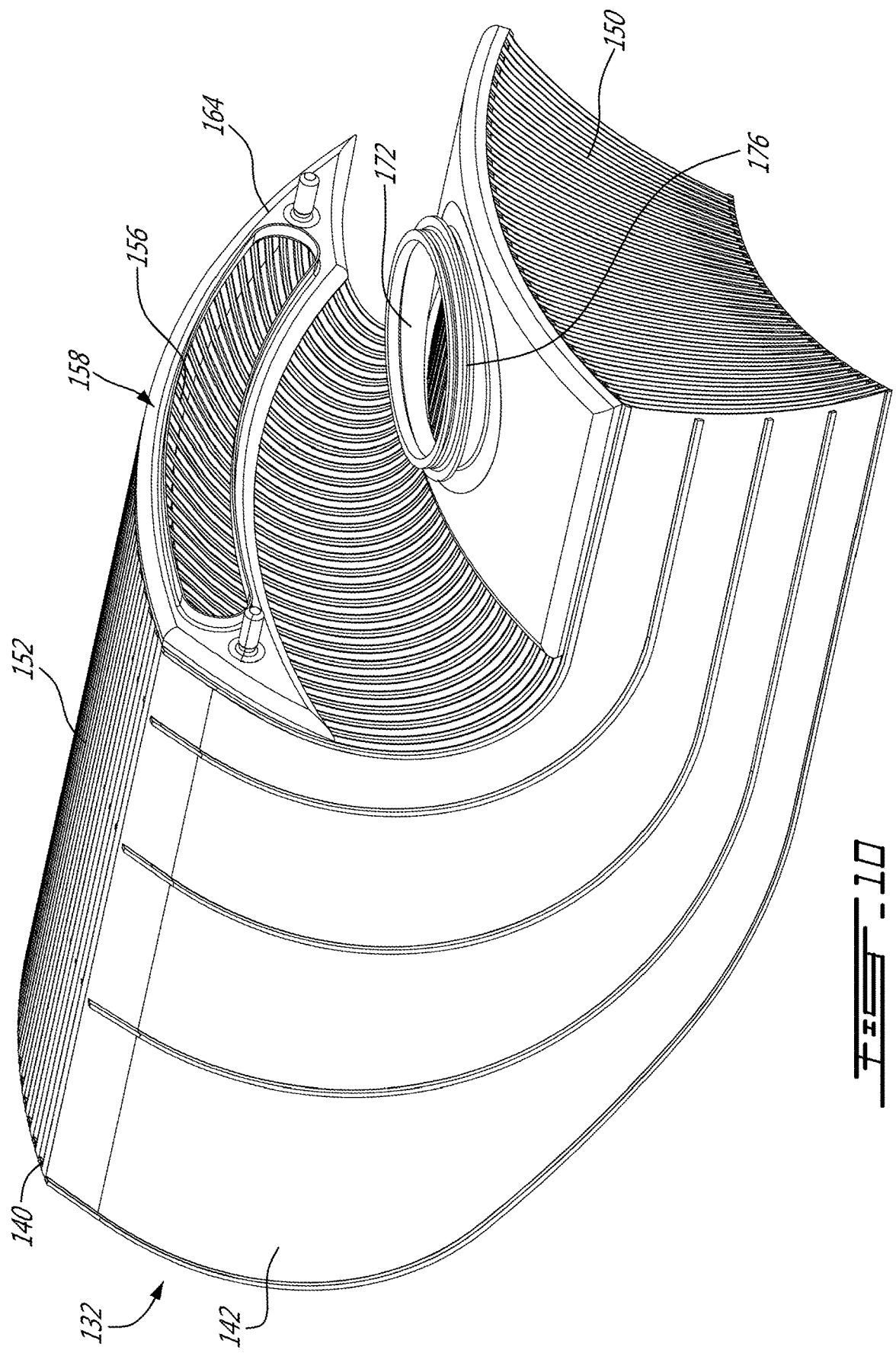

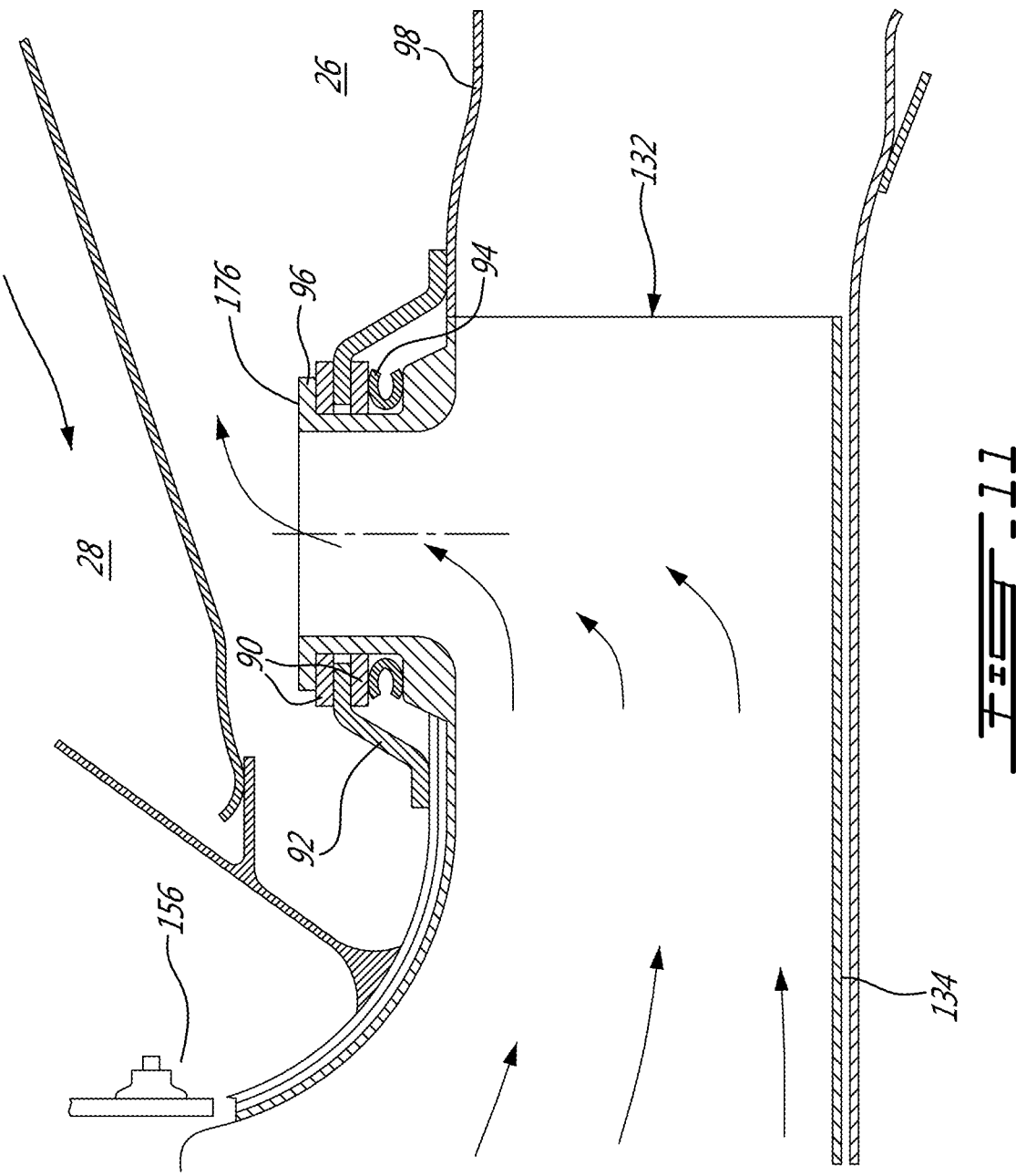

GAS TURBINE ENGINE RECUPERATOR WITH FLOATING CONNECTION

CROSS-REFERENCE TO RELATED APPLICATIONS

This application is a divisional of U.S. application Ser. No. 13/036,407 filed Feb. 28, 2011, now U.S. Pat. No. 9,394,828, the entire contents of which are incorporated by reference herein.

TECHNICAL FIELD

The application relates generally to a recuperator for a gas turbine engine and, more particularly, to such a recuperator allowing for a reduction of thermal stresses therein.

BACKGROUND OF THE ART

Gas turbine engines may include a recuperator, which is a heat exchanger using hot exhaust gas from the engine to heat the compressed air exiting the compressor prior to circulation of the compressed air to the combustion chamber. Preheating the compressed air usually improves fuel efficiency of the engine. In addition, the recuperator reduces the heat of exhaust gas, which helps minimize the infrared signature of the aircraft.

However, the high temperature differential within the recuperator typically induces thermal stresses which can significantly reduce its life. Seal failures may occur between the recuperator and the adjacent components, and such may affect the reliability of the engine. Some prior art recuperator structures are also relatively heavy and/or costly to manufacture, and as such generally unsuitable for aircraft use.

Accordingly, improvements are desirable.

SUMMARY

In one aspect, there is provided a gas turbine engine comprising a compressor section having a discharge in fluid flow communication with a first plenum, a combustor contained in a second plenum, a turbine section in fluid flow communication with the combustor, an exhaust duct in fluid flow communication with the turbine section, and a recuperator located in the exhaust duct, the recuperator including a plurality of independent annular segment, each segment defining: exhaust passages providing fluid flow communication between an exhaust inlet and an exhaust outlet, the exhaust inlet and exhaust outlet extending across the exhaust duct with the exhaust inlet being in fluid flow communication with the turbine section, air passages in heat exchange relationship with the exhaust passages and providing fluid flow communication between an air inlet and an air outlet, an inlet connection member defining the air inlet and sealingly engaging the first plenum to receive pressurized air from the compressor, and an outlet connection member defining the air outlet and sealingly engaging the second plenum containing the combustor, with one of the inlet and outlet connection members defining a rigid connection with the corresponding one of the first and second plenums, and the other of the inlet and outlet connection members defining a floating connection allowing relative movement between the other of the inlet and outlet connection members and the corresponding one of the first and second plenums, the inlet and outlet connection members defining the only connections between the segment and a remainder of the gas turbine engine.

In another aspect, there is provided a recuperator comprising a plurality of independent arcuate segments configured to extend within an exhaust duct of a gas turbine engine, each segment including exhaust passages providing fluid flow communication between an exhaust inlet and an exhaust outlet, the exhaust inlet being oriented to receive exhaust flow from a turbine of the engine and the exhaust outlet being oriented to deliver the exhaust flow to atmosphere, air passages in heat exchange relationship with the exhaust passages and providing fluid flow communication between an air inlet and an air outlet, an inlet connection member defining the air inlet and being designed to sealingly engage a first plenum in fluid flow communication with a compressor discharge of the gas turbine engine, and an outlet connection member defining the air outlet and being designed to sealingly engage a second plenum containing a compressor of the gas turbine engine, wherein one of the inlet and outlet connection members is a rigid member forming a rigid connection to the respective plenum, and the other of the inlet and outlet connection members includes a flexible member and forms a floating connection to the respective plenum, the floating connection allowing relative movement between the segment and a remainder of the gas turbine engine.

In a further aspect, there is provided a method of installing a segment of a recuperator within an exhaust duct of a gas turbine engine, the recuperator having exhaust passages extending between an exhaust inlet and an exhaust outlet and air passages in heat exchange relationship with the exhaust passages and extending between an air inlet and an air outlet, the method comprising positioning the segment such that the exhaust inlet is in fluid flow communication with a turbine section of the engine and the exhaust outlet is adapted to deliver an exhaust flow to atmosphere, engaging the air inlet to a plenum in fluid flow communication with a compressor discharge of the gas turbine engine, and engaging the air outlet to another plenum containing a combustor of the gas turbine engine, wherein one of engaging the air inlet and engaging the air outlet includes forming a rigid connection providing sealed fluid flow communication with the corresponding plenum, and the other of engaging the air inlet and engaging the air outlet includes forming a floating connection providing sealed fluid flow communication with the corresponding plenum, the floating connection allowing relative movement of the segment within the exhaust duct.

DESCRIPTION OF THE DRAWINGS

Reference is now made to the accompanying figures in which:

FIG. 9 is a tridimensional view of the recuperator of FIG. 8;

FIG. 10 is a tridimensional view of a segment of the recuperator of FIG. 8, with a side plate removed;

FIG. 11 is a schematic cross-sectional view of a floating connection between the recuperator of FIG. 8 and a plenum of the gas turbine engine;

DETAILED DESCRIPTION

Figure 1:
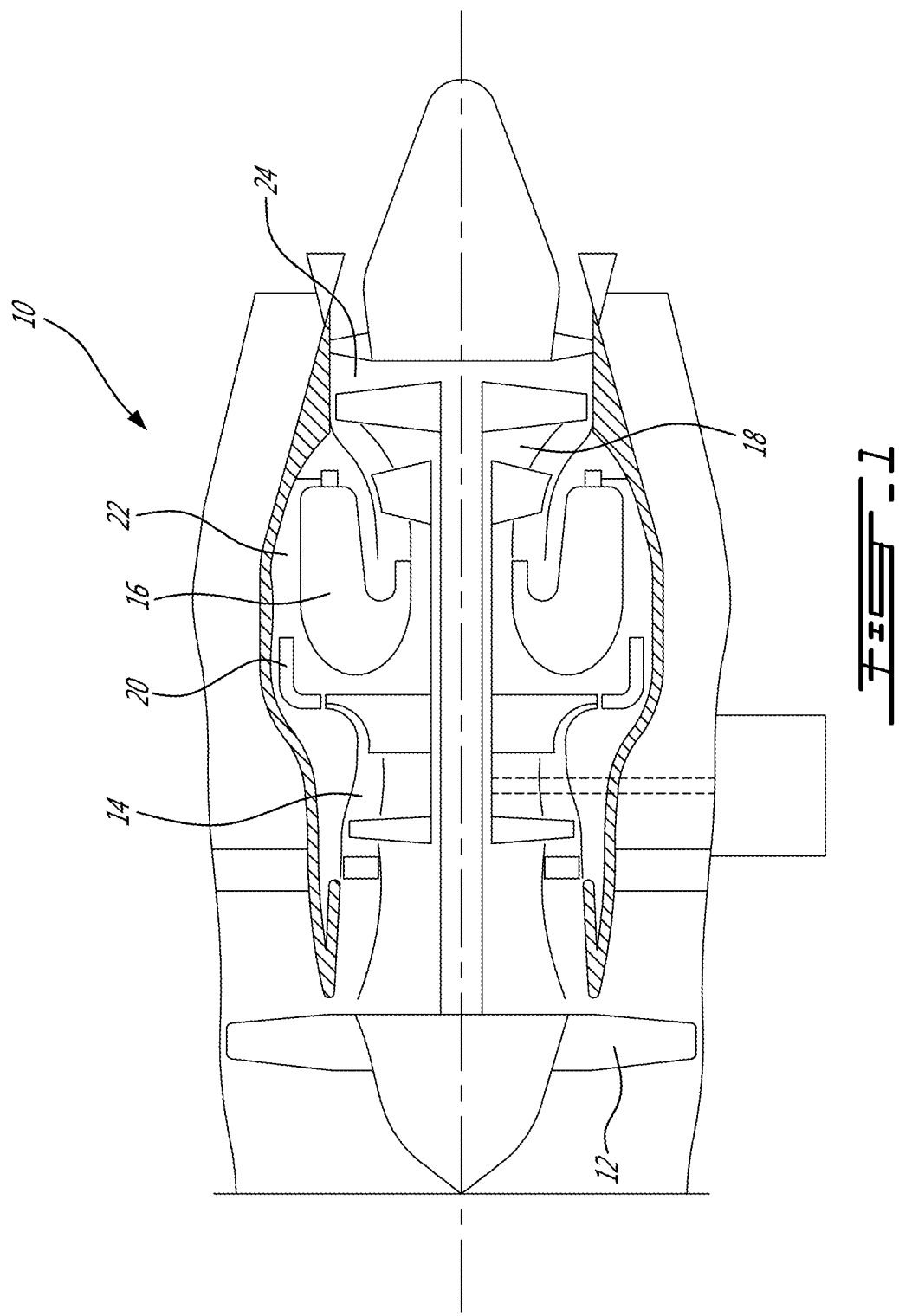
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and combustor 16 are typically in serial flow communication with one another through a gas generator case 22 which contains the combustor 16 and which receives the flow from the compressor discharge, which in the embodiment shown is in the form of diffuser pipes 20. The combustion gases flowing out of the combustor 16 circulate through the turbine section 18 and are then expelled through an exhaust duct 24.

Although illustrated as a turbofan engine, the gas turbine engine 10 may alternately be another type of engine, for example a turboshaft engine, also generally comprising in serial flow communication a compressor section, a combustor, and a turbine section, and a propeller shaft supporting a propeller and rotated by a low pressure portion of the turbine section through a reduction gearbox.

Figure 2:
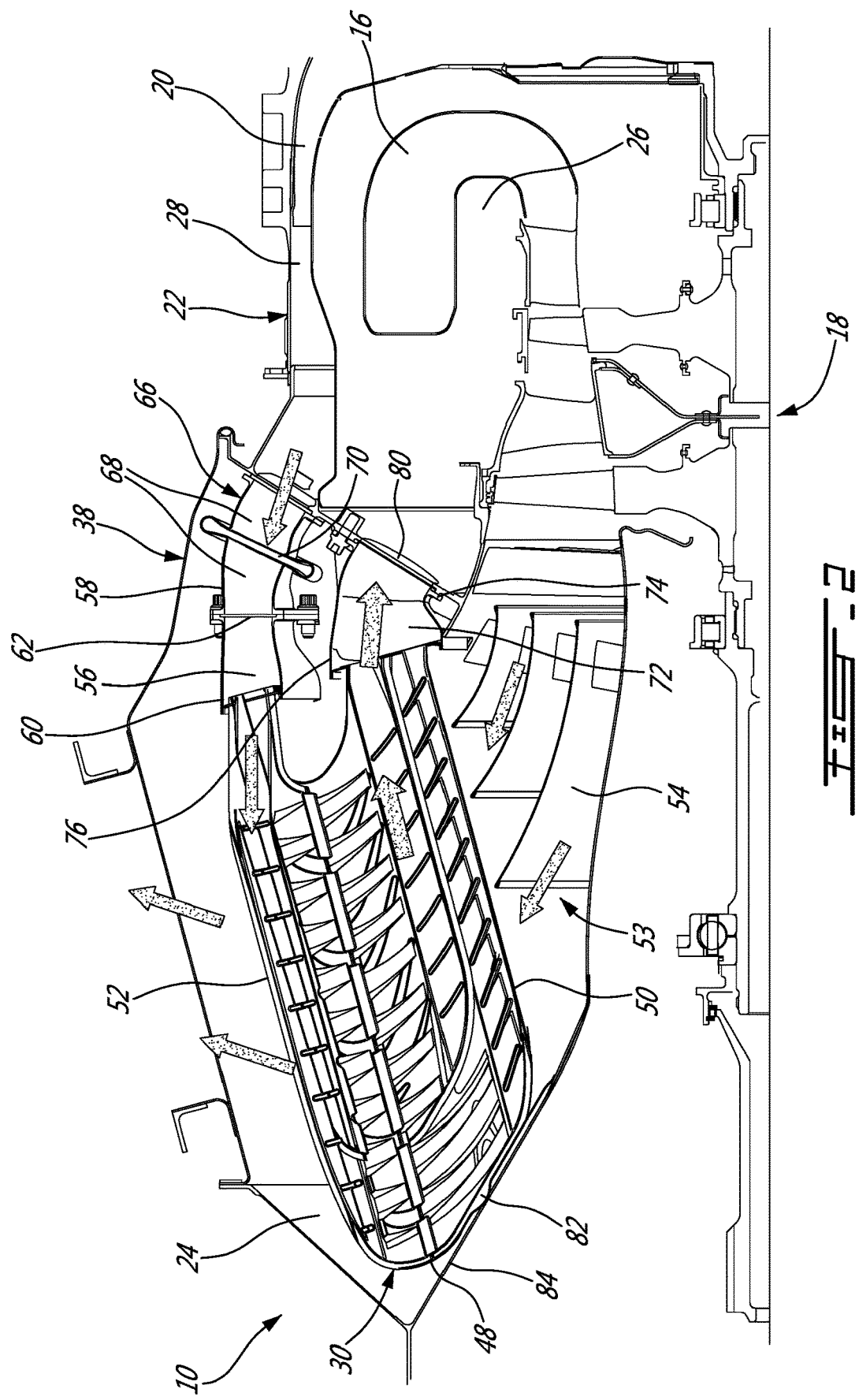
FIG. 2 is a partial cross-sectional view of a gas turbine engine, showing a recuperator according to a particular embodiment.
Figure 3:
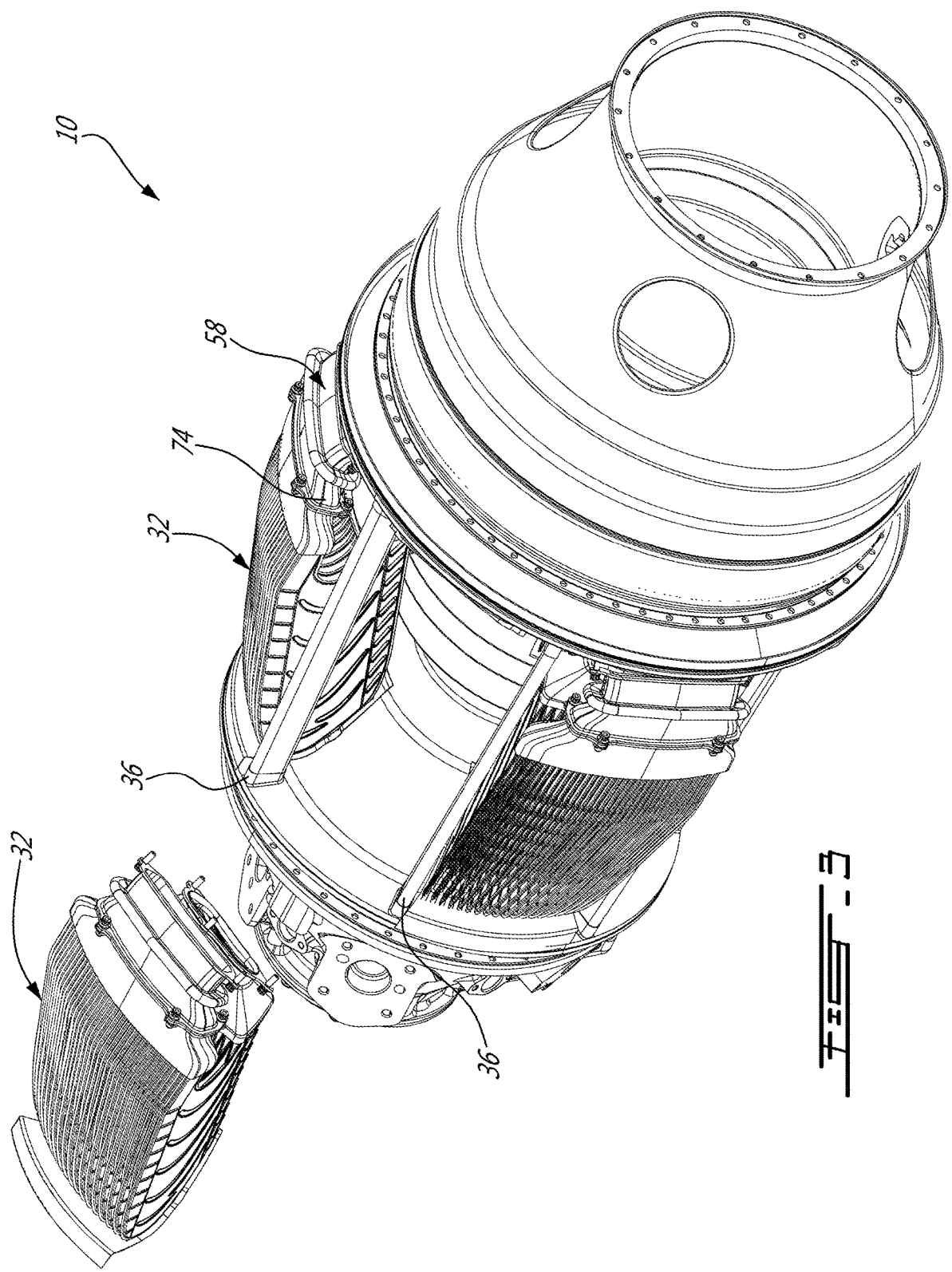
FIG. 3 is a schematic tridimensional view of a gas turbine engine including the recuperator of FIG. 2, with one segment thereof removed.
Figure 4:
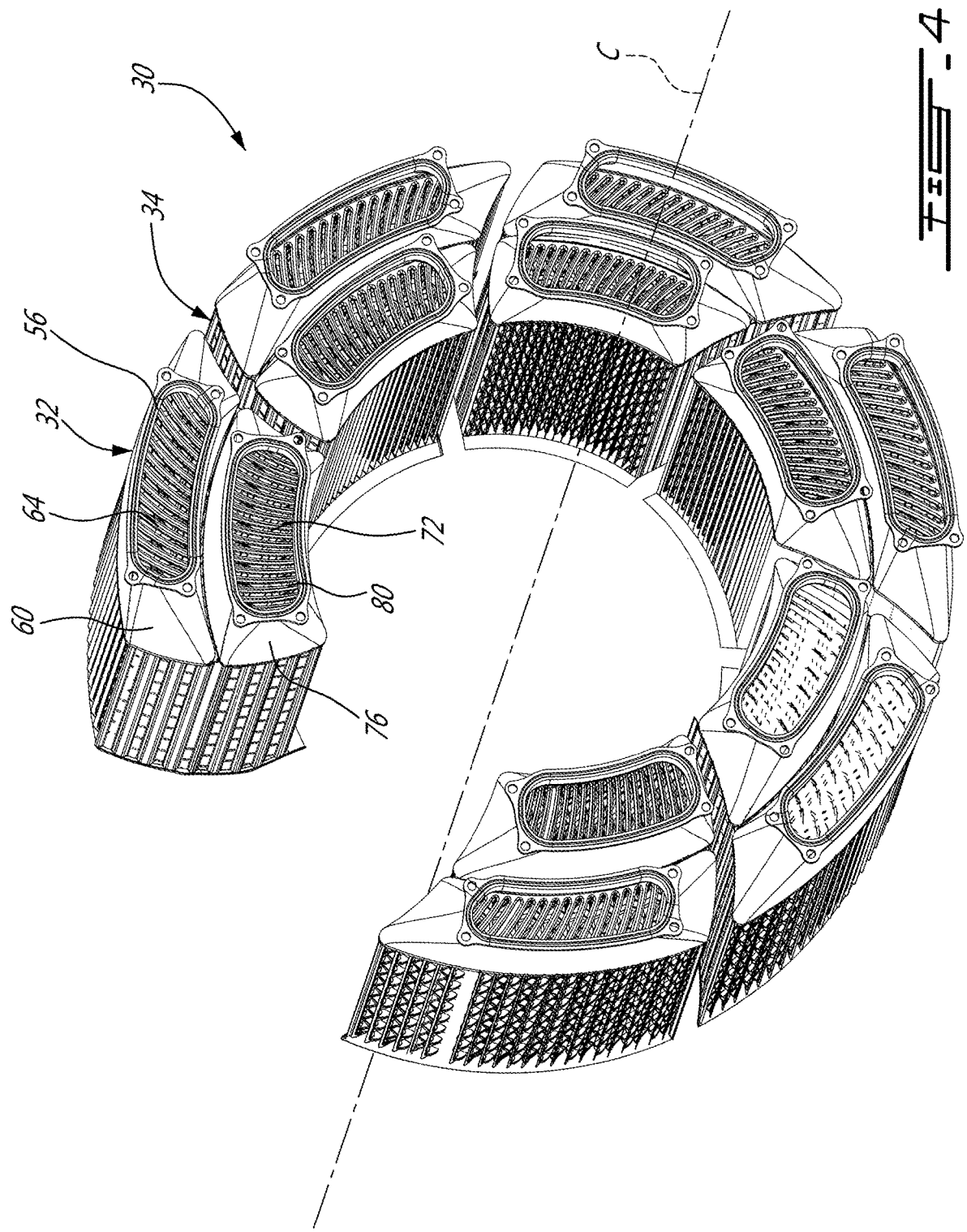
FIG. 4 is a tridimensional view of the recuperator of FIG. 2, with one segment thereof omitted.

Referring to FIG. 2, in the present embodiment, the gas generator case 22 is separated in at least two plenums, including a plenum 26 containing the combustor 16, and another plenum 28 in fluid flow communication with the diffuser pipes 20 of the compressor section 14.

A recuperator 30 extends across the exhaust duct 24, such that the exhaust gas from the turbine section 18 circulates therethrough. The recuperator 30 also provides the fluid flow communication between the combustor plenum 26 and the compressor plenum 28, as will be further detailed below.

Referring to FIG. 3-6, the recuperator 30 includes a plurality of arcuate segments 32, which function independently from one another and are connected to the engine 10 independently from one another, and which together define the annular shape of the recuperator 30. A controlled gap 34 (see FIG. 4) is provided between adjacent ones of the segments 32 to allow for thermal expansion without interference. In a particular embodiment, the segments 32 are sized to extend between adjacent structural struts 36 (see FIG. 3) of the engine 10, and as such the gap 34 is sized to allow for thermal expansion of each segment 32 without major interference with the strut 36 extending in the gap 34. A compressible side plate 46 at the side of the segment 32 provides sealing with the strut 36 and vibrational damping during engine operation. In the embodiment shown, each segment 32 is sized and located such as to be removable from the outside of the engine 10 through an opening accessible when the exhaust scroll 38 (see FIG. 2) is removed. With an exhaust scroll 38 that is removable on the wing, such a configuration allows for the recuperator segments 32 to be removed and replaced if necessary with the engine 10 remaining on the wing.

Figure 5:
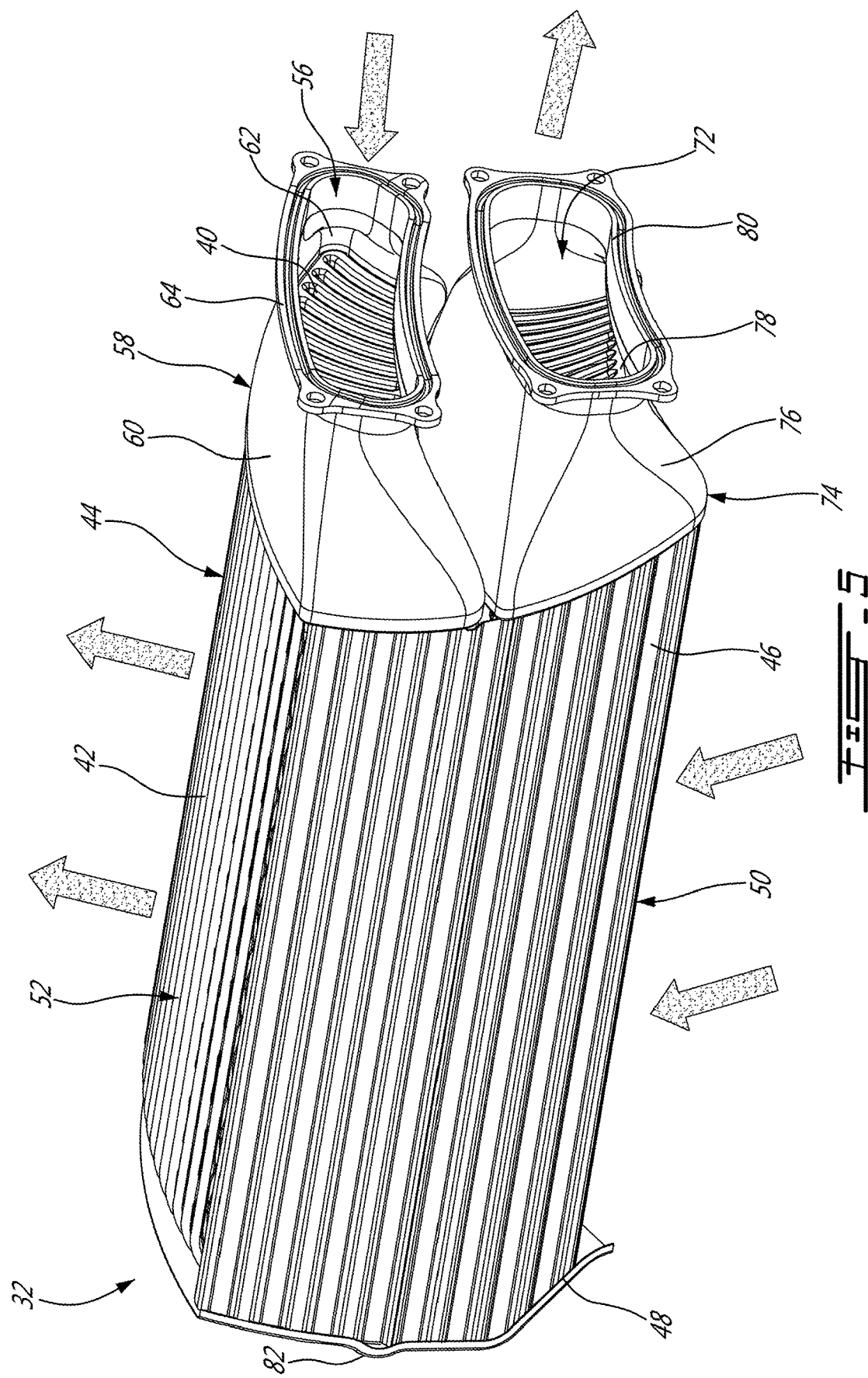
FIG. 5 is a tridimensional view of a segment of the recuperator of FIG. 2.
Figure 6:
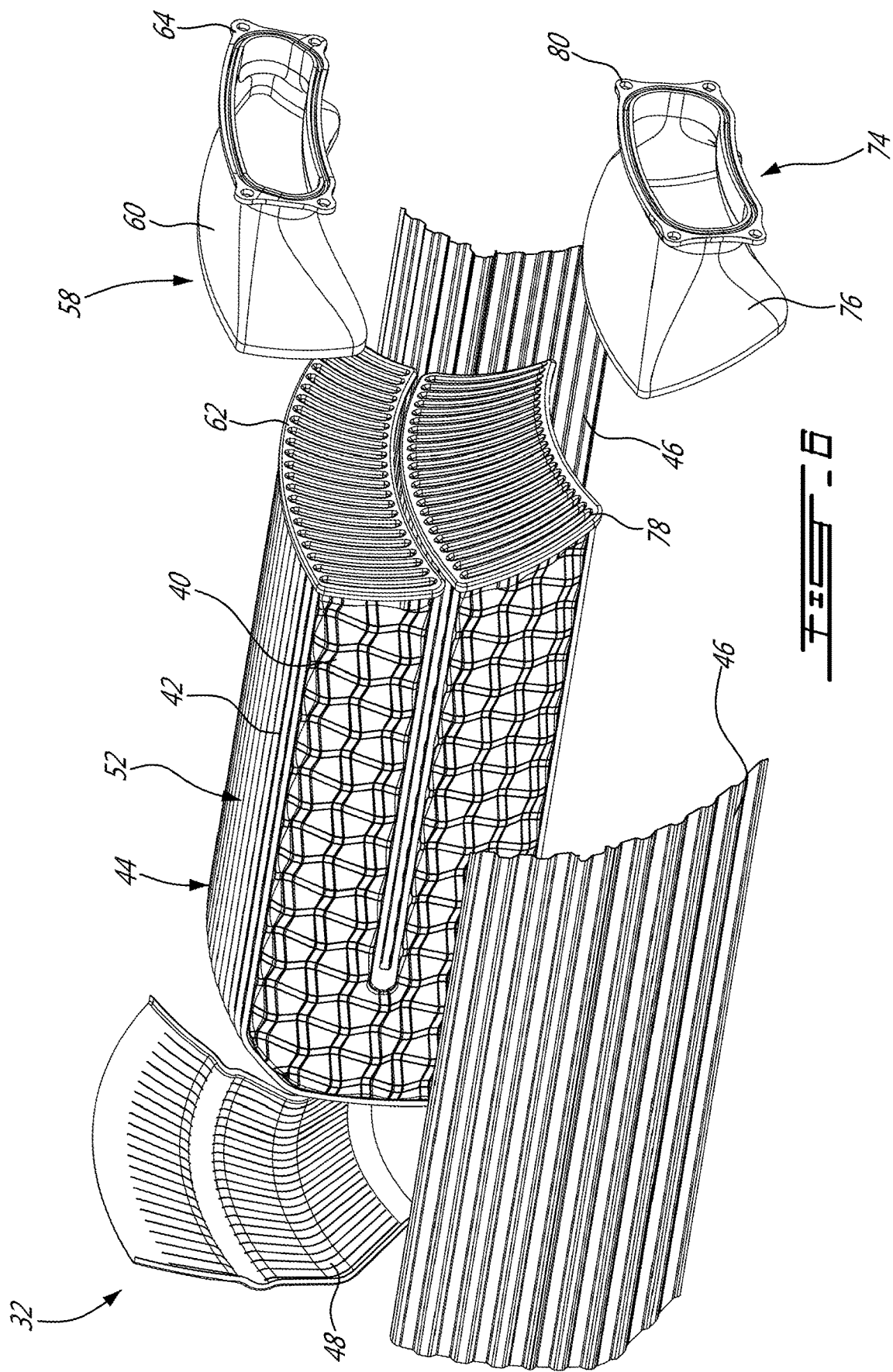
FIG. 6 is an exploded tridimensional view of the segment of FIG. 5.

Referring particularly to FIGS. 5-6, each segment 32 defines a plate heat exchanger, with a first group of fluid passages 40 for circulating the compressed air, and a second group of fluid passages 42 for circulating the exhaust gas. The air and exhaust passages 40, 42 alternate and are in heat transfer relationship with one another. In the embodiment shown, the air and exhaust passages 40, 42 are relatively oriented such as to define a mixed counter flow and double pass cross flow heat exchanger. A panel assembly 44 thus defines the alternating U-shaped first fluid passages 40 and curved second fluid passages 42. In a particular embodiment, the panels 44 are made of a nickel alloy and are brazed to one another. The side plates 46 and a rear bulkhead 48 respectively seal the opposed side ends and the rear end of the panel assembly 44. The bulkhead 48 also provides vibrational damping of the segment 32 during engine operation.

The exhaust fluid passages 42 communicate with a same exhaust inlet 50 defined by the radially inward end of the segment 32 and with a same exhaust outlet 52 defined by the radially outward end of the segment 32. The exhaust inlet and outlet 50, 52 extend across the exhaust duct 24, with the exhaust inlet 50 located in proximity of the turbine section 18.

Referring to FIGS. 5-6, the air passages 40 communicate with a same air inlet 56 defined at one end thereof and with a same air outlet 72 defined at the opposed end thereof. The air inlet 56 is defined by an inlet connection member 58 which is designed to sealingly engage the compressor plenum 28 for receiving the compressed air. The air inlet 56 is oriented such that the compressed air flows axially or approximately axially therethrough. The inlet connection member 58 includes a duct 60 having one end connected to an inlet bulkhead 62 attached to the panel assembly 44, and an opposed end having a flange 64 extending outwardly therearound. Referring to FIG. 2, the inlet connection member 58 also includes a flexible duct member 66 having a first end rigidly connected to the flange 64, for example through an appropriate type of fasteners with a compressible seal ring or a gasket (not shown) therebetween. A second end of the flexible duct member 66 is rigidly connected to the compressor plenum 28. In the embodiment shown, the flexible duct member 66 includes two rigid duct portions 68 interconnected by a diaphragm 70, which allows relative movement between the two duct portions 68; alternately, the entire flexible duct member 66 may be made of flexible material. Accordingly, "flexible duct member" is intended herein to designate a duct member which includes at least a flexible portion such as to allow for relative movement between its opposed ends. The inlet connection member 58 thus defines a floating connection with the compressor plenum 28, such that some amount of axial and radial relative motion is allowed therebetween.

Referring back to FIGS. 5-6, the air outlet 72 is defined by an outlet connection member 74 which is designed to sealingly engage the combustor plenum 26 for delivering the heated compressed air to the combustor 16. The air outlet 72 is oriented such that the heated compressed air flows axially or approximately axially therethrough. The outlet connection member 74 includes a duct 76 having one end connected to an outlet bulkhead 78 attached to the panel assembly 44, and an opposed end having a flange 80 extending outwardly therearound. Referring to FIG. 2, the flange 80 is rigidly connected to the combustor plenum 26, for example through an appropriate type of fasteners. A compressible seal ring or a gasket (not shown) is received between the flanged 80 and the plenum 26 to form a sealed connection. The outlet connection member 74 thus defines a rigid connection with the combustor plenum 26.

Alternately, the inlet connection member 58 may define a rigid connection with the compressor plenum 28, with the outlet connection member 74 defining a floating connection with the combustor plenum 26.

Referring back to FIG. 2, in the embodiment shown, the rear bulkhead 48 includes a protrusion 82 which is designed to be the contact point between the segment 32 and the wall 84 of the exhaust duct 24, in order to stabilize the position of the segment 32 within the exhaust duct 24. The protrusion 82 facilitates the relative sliding motion between the rear bulkhead 48 and the exhaust duct wall 84 when relative movement due to the floating connection occurs, and acts as a control surface maintaining contact between the segment 32 and the exhaust duct wall 84.

In a particular embodiment, the exhaust passages 42 have a flaring shape, i.e. the cross-sectional area of each exhaust passage 42 increases from the exhaust inlet 50 to the exhaust outlet 52, such as to diffuse the exhaust flow. The exhaust inlet 50 thus has a smaller cross-sectional area than that of the exhaust outlet 52. Referring particularly to FIG. 2, a concentric split diffuser 53 is provided in the exhaust duct 24 upstream of the exhaust inlet 50. The diffuser 53 includes circumferential splitters 54 which are supported by radial struts 55. The splitters 54 progressively curve from the axial direction at the upstream end toward the radial direction. The splitters 54 define passages having a flaring shape, i.e. with an upstream end having a smaller cross-sectional area than the downstream end, to diffuse of the exhaust flow further diffused within the recuperator 30. Diffuser vanes 51 may also be provided at the exit of the power turbine, upstream of the split diffuser 53. The diffusion of the exhaust flow allows for an improved heat exchange within the recuperator 30.

Figure 7:
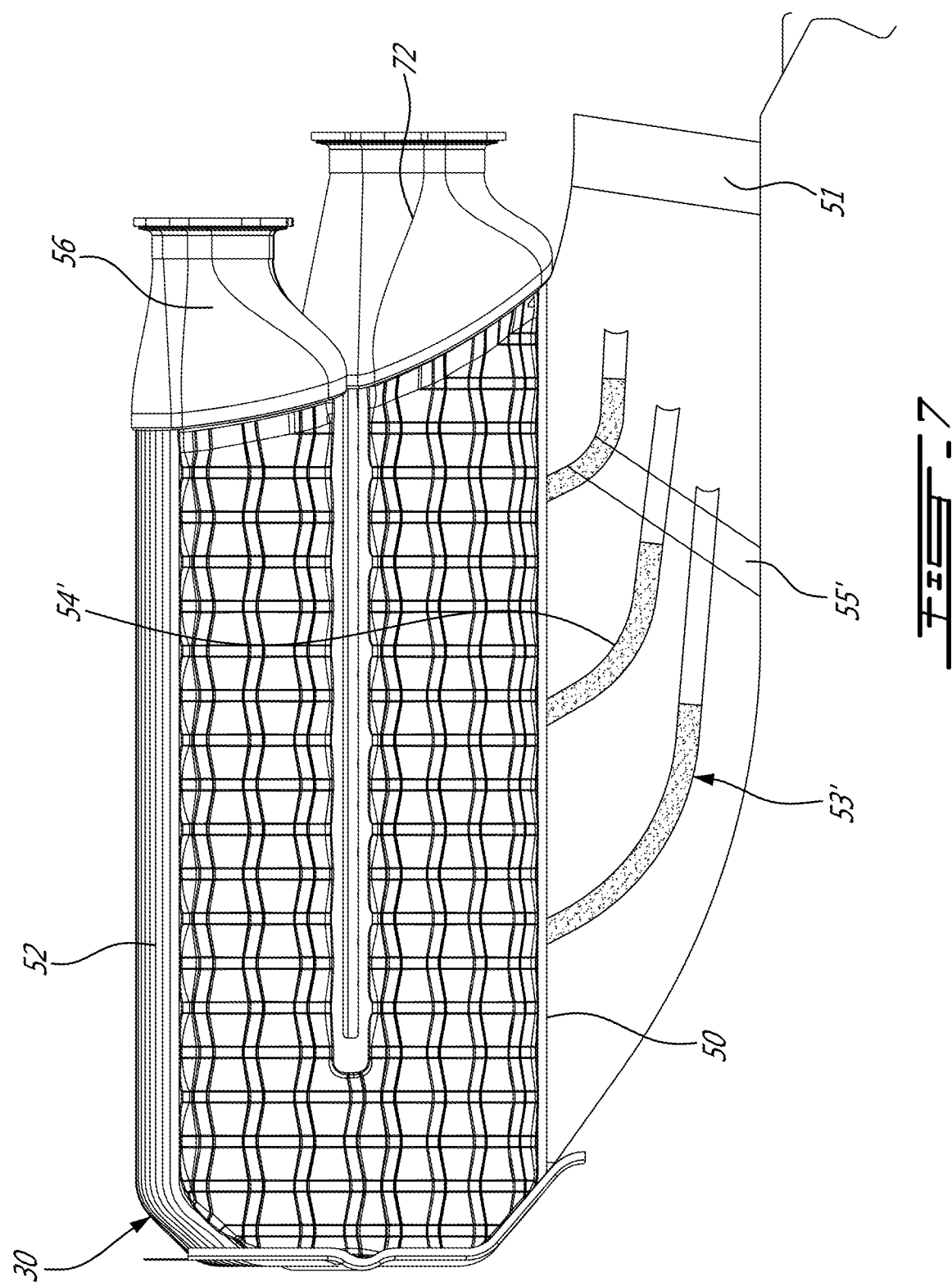
FIG. 7 is a partial cross-sectional view of a gas turbine engine, showing the recuperator of FIG. 2 with a diffuser attached thereto.

In the alternate embodiment shown in FIG. 7, the concentric split diffuser 53' including splitters 53' and radial struts 55' forms part of the recuperator 30, and extends from the exhaust inlet 50.

In a particular embodiment, the recuperator 30 also reduces the swirl of the exhaust flow. As can be seen from FIG. 4, the exhaust passages 42 have an arcuate profile in a plane perpendicular to a central axis C of the recuperator to reduce the exhaust flow swirl. The splitters 54 (FIG. 2) may also be curved in the plane perpendicular to the central axis of the recuperator. The radial struts 55, 55' which are structural members supporting the splitters 54, 54' (FIGS. 2 and 7) have an asymmetrical airfoil shape twisted to allow a progressively increased swirl with increasing radius, optimised to reduce the turning losses as the flow turns from the axial to the radial direction within the diffuser 53, 53'. The vanes 51 may also have an asymmetrical airfoil shape similar to the struts 55, 55'. The swirl, i.e. the circumferential component of the flow velocity at the power turbine exit, is thus first slowed in the diffuser vanes 51. The flow exiting the vanes 51 enter the split diffuser 53, 53'. The flow in the split diffuser 53, 53' slows down both in the axial direction due to the splitters 54, 54' as well as in circumferential direction, i.e. the swirl, due to the increased radius of the swirling shape of the radial struts 55, 55'.

Referring now to FIGS. 8-12, a recuperator 130 according to an alternate embodiment is shown. The recuperator 130 includes a plurality of independent arcuate segments 132, with a controlled gap 134 being defined between adjacent segments 132 for thermal expansion. Each segment 132 defines a plate heat exchanger, with a first group of fluid passages 140 for circulating the compressed air, and a second group 142 of fluid passages for circulating the exhaust gas, alternating and in heat transfer relationship with one another.

The recuperator 130 extends within the exhaust duct 24 closer to the turbine section 18 than the previously described embodiment. Each segment 132 includes an exhaust inlet 150 defined by a radially extending end of the segment 132 located in proximity of the turbine section 18 and in communication with the exhaust passages 142. The exhaust inlet 150 is oriented such that the exhaust gas flows axially or approximately axially therethrough. Each segment 132 also includes an exhaust outlet 152 in communication with exhaust passages 142, and oriented such that the exhaust gas flows outwardly radially or approximately outwardly radially therethrough.

The air passages 140 communicate with a same air inlet 156 defined at one end thereof and with a same air outlet 172 defined at the opposed end thereof. The air inlet 156 is defined by an inlet connection member 158 which is designed to sealingly engage the compressor plenum 28 for circulating the compressed air. The air inlet 156 is oriented such that the compressed air flows axially or approximately axially therethrough. The inlet connection member 158 includes a support 164 surrounding the inlet 156 which is rigidly connected to the compressor plenum 28, for example through an appropriate type of fasteners with a compressible seal ring or a gasket (not shown) therebetween. The inlet connection member 158 thus defines a rigid connection with the compressor plenum 28.

The air outlet 172 is defined by an outlet connection member 174 which is designed to sealingly engage the combustor plenum 26 for delivering the heated compressed air to the combustor 16. The air outlet 172 is oriented such that the heated compressed air flows radially outwardly or approximately radially outwardly therethrough. The outlet connection member 174 includes a duct 176 which is engaged in a corresponding opening of the combustor plenum 26. Referring to FIG. 11, a flexible and compressible circular seal 94, for example having a C-shaped cross-section, surrounds the duct 176 and abuts the wall 98 of the plenum 26 around the opening where the duct 176 is received. A collar 92, sandwiched between retaining rings 90, is received between the seal 94 and an outwardly extending flange 96 of the duct 176, and compresses the seal 94. The connection member 174 thus defines a floating connection with the combustor plenum 26, as some amount of axial and tangential relative motion is allowed between the connection member 174 and the support opening of the plenum 26 to compensate for thermal mismatch. The circular seal 94 seals the connection.

Figure 8:
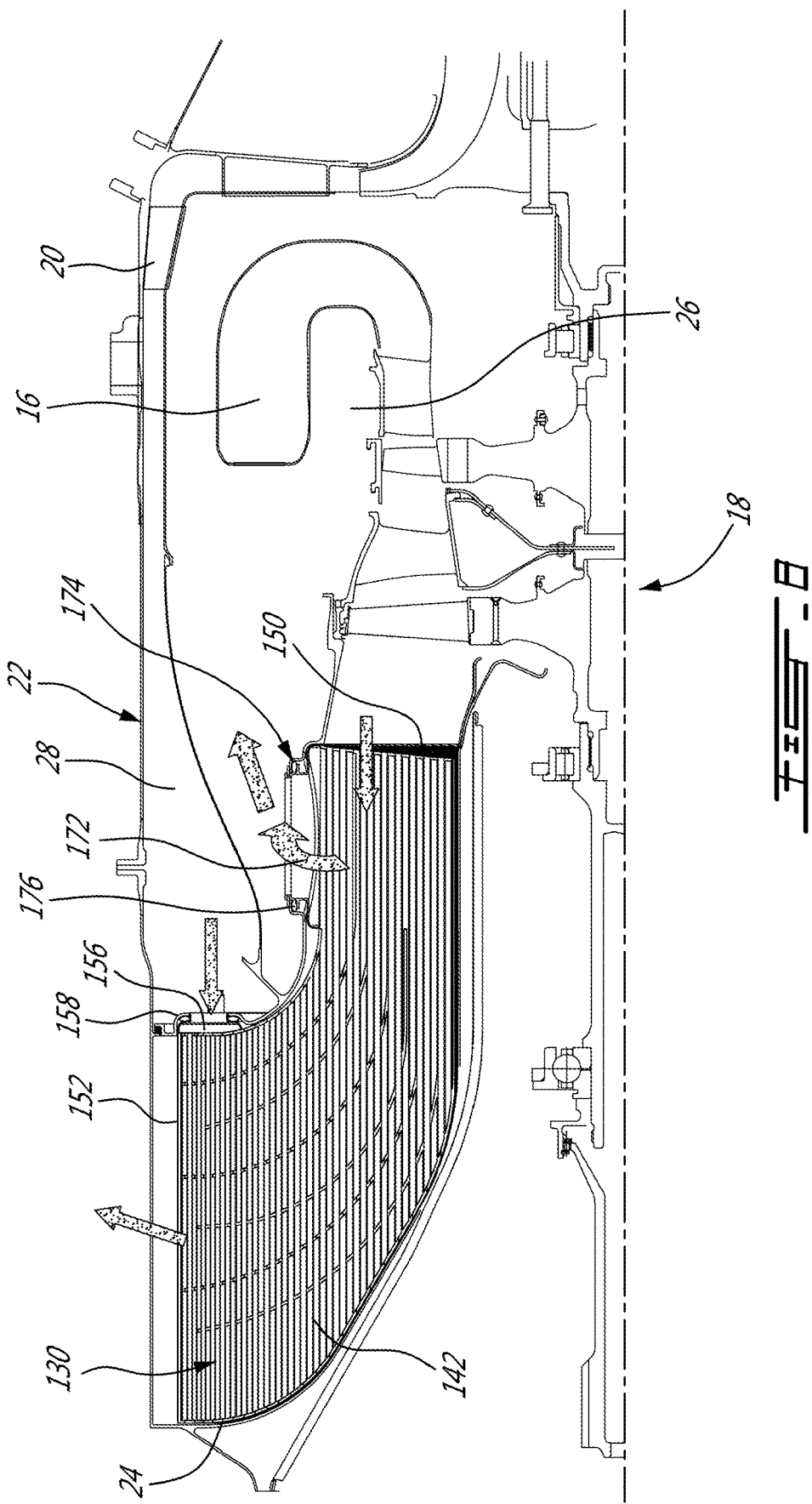
FIG. 8 is a partial cross-sectional view of a gas turbine engine, showing a recuperator according to another embodiment.
Figure 12A:
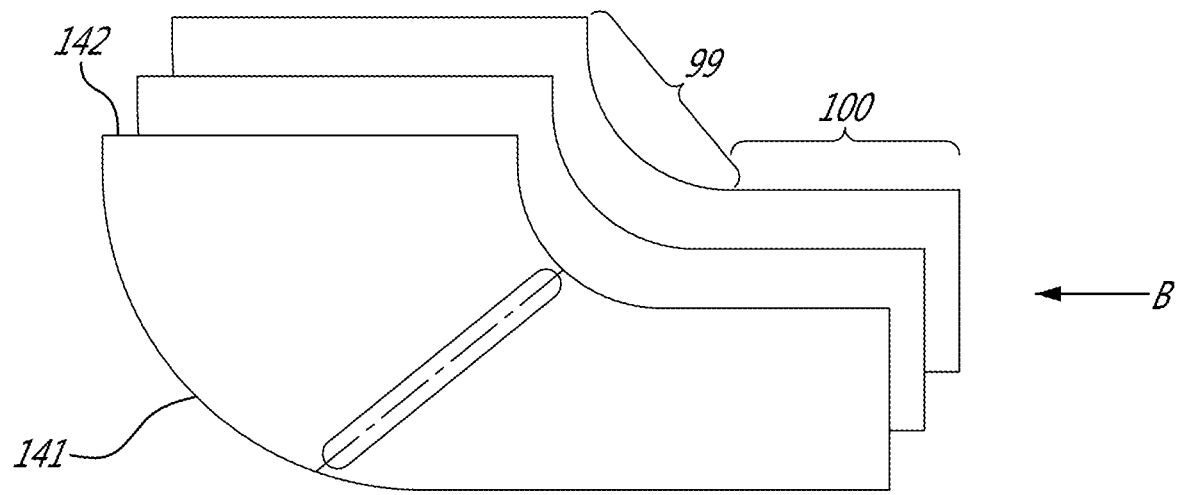
FIG. 12A is a schematic representation of the shape of cold air cells of the recuperator of FIG. 8.
Figure 12B:
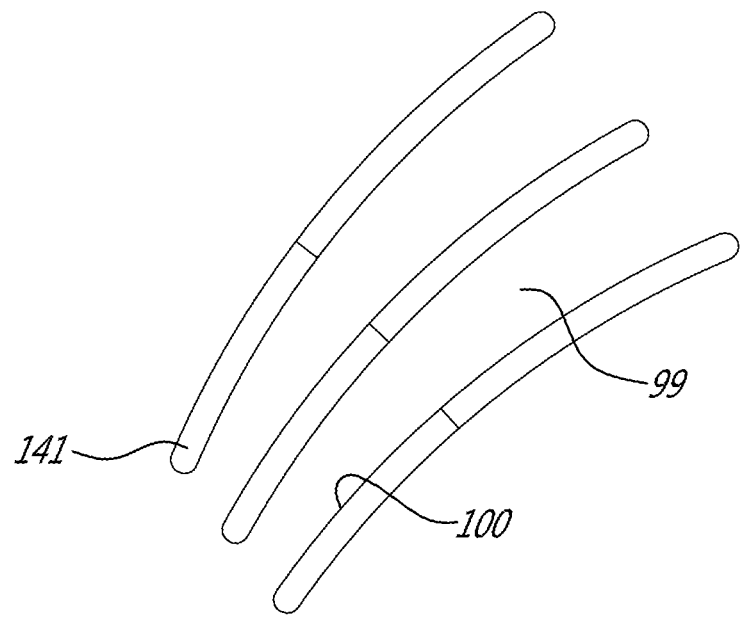
FIG. 12B is a schematic representation of the shape of the cold air cells of taken along direction B of FIG. 12A.

As can be seen in FIG. 8 and FIG. 12B, the exhaust passages 142, defined between the air cells 141 forming the air passages 140, have a flaring shape such as to diffuse the exhaust flow. The exhaust inlet 150 thus has a smaller cross-sectional area than that of the exhaust outlet 152. The diffusion of the exhaust flow allows for an improved heat exchange within the recuperator 130. In the embodiment shown, the recuperator 130 has a shape substantially conforming to that of the exhaust duct 24, with a controlled gap 134 (see FIG. 11) being provided between the recuperator 130 and exhaust duct wall to prevent restriction of the relative movement allowed by the floating connection.

In a particular embodiment, the recuperator 130 also reduces the swirl of the exhaust flow. As can be seen from FIGS. 9 and 12B, the air cells 141 forming the exhaust passages 142 act as vanes, and have an arcuate profile in a plane perpendicular to a central axis C of the recuperator to reduce the exhaust flow swirl. The air cells 141 thus define a diffusion area 99 and a deswirling and diffusion area 100, which act to slow down the exhaust flow both in the axial direction as well as in circumferential direction.

In the above described embodiments, each segment 32, 132 of the recuperator 30, 130 is only connected to the engine 10 through the inlet and outlet connection members 58, 158, 74, 174, and the segments 32, 132 are independent from each other. Since one of these connection members defines the only rigid connection between the segment and the remainder of the gas turbine engine (i.e. the elements of the gas turbine engine not part of the recuperator 30, 130) and the other of these connection members defines a floating connection, some relative movement is allowed between each segment 32, 132 of the recuperator 30, 130 and the remainder of the gas turbine engine 10, such as to accommodate some amount of thermal expansion without impeding the seal of the connections.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of installing a recuperator within an exhaust duct of a gas turbine engine around a central axis of the gas turbine engine, the gas turbine engine having a turbine section, the recuperator segmented circumferentially into a plurality of segments, at least one segment of the plurality of segments having exhaust passages contained in the exhaust duct and extending between an exhaust inlet and an exhaust outlet, and air passages in heat exchange relationship with the exhaust passages and extending between an air inlet and an air outlet, the method comprising:
   positioning the plurality of segments inside the exhaust duct around the central axis and axially spaced apart from the turbine section along said central axis of the gas turbine engine and providing a controlled gap between adjacent segments of the plurality of segments that circumferentially space apart and prevent contact between the adjacent segments;
   positioning the at least one segment such that the exhaust inlet is in fluid flow communication with the turbine section of the engine and the exhaust outlet is adapted to deliver an exhaust flow to atmosphere;
   connecting the plurality of segments inside the exhaust duct independently from each other to maintain the controlled gap upon connection, such that the plurality of segments are allowed to thermally expand without interfering with thermal expansion of adjacent segments of the plurality of segments, including:
      engaging the air inlet to a first plenum in fluid flow communication with a compressor discharge of the gas turbine engine; and
      engaging the air outlet to a second plenum containing a combustor of the gas turbine engine;
      wherein one of engaging the air inlet and engaging the air outlet includes forming a rigid connection providing sealed fluid flow communication with the corresponding a one of the first and second plenums, and the other of engaging the air inlet and engaging the air outlet includes forming a floating connection providing sealed fluid flow communication with the other one of first and second plenums, the floating connection allowing relative movement of the at least one segment about the floating connection relative to the other one of the first and second plenums, the relative movement of the at least one segment within the exhaust duct allowed by the floating connection being defined along different, non-parallel directions with respect to the central axis of the gas turbine engine.

2. The method as defined in claim 1, further comprising a preliminary step of detaching and removing an exhaust scroll of the gas turbine engine, the at least one segment being installed through an opening previously covered by the exhaust scroll.

3. The method as defined in claim 1, wherein engaging the air outlet includes forming the rigid connection and engaging the air inlet includes forming the floating connection.

4. The method as defined in claim 1, wherein forming the floating connection includes rigidly attaching a flexible duct member of the at least one segment to the other one of the first and second plenums.

5. The method as defined in claim 1, further comprising positioning a control surface of the at least one segment against a wall of the exhaust duct without impeding relative movement between the control surface and the wall.

6. The method as defined in claim 1, wherein the plenums are contained in an outer case of the engine.

7. The method as defined in claim 1, wherein positioning the at least one segment includes positioning the exhaust passages and the air passages within the exhaust duct.

8. The method as defined in claim 1, wherein the rigid connection is contained in the engine.

9. The method as defined in claim 1, wherein the floating connection is contained in the engine.

10. The method as defined in claim 1, wherein the relative movement of the at least one segment within the exhaust duct allowed by the floating connection is defined along axial and radial directions with respect to the central axis of the gas turbine engine.

11. The method as defined in claim 1, wherein forming the rigid connection includes forming the only rigid connection between the at least one segment and all elements of the gas turbine engine not forming part of the recuperator.

* * * * *